US008794937B2

(12) United States Patent
Kheradvar et al.

(10) Patent No.: US 8,794,937 B2
(45) Date of Patent: Aug. 5, 2014

(54) HELICALLY ACTUATED POSITIVE-DISPLACEMENT PUMP AND METHOD

(75) Inventors: Arash Kheradvar, Irvine, CA (US); Morteza Gharib, Altadena, CA (US); Anna Hickerson, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 79 days.

(21) Appl. No.: 13/022,562

(22) Filed: Feb. 7, 2011

(65) Prior Publication Data
US 2011/0165001 A1 Jul. 7, 2011

Related U.S. Application Data

(63) Continuation of application No. 11/389,525, filed on Mar. 24, 2006, now Pat. No. 7,883,325.

(60) Provisional application No. 60/665,462, filed on Mar. 25, 2005.

(51) Int. Cl.
*F04B 43/08* (2006.01)

(52) U.S. Cl.
USPC .............................. 417/478; 417/479; 417/472

(58) Field of Classification Search
USPC ....................... 417/472, 474, 477.4, 478, 479; 92/89–92; 251/4
See application file for complete search history.

(56) References Cited

U.S. PATENT DOCUMENTS

| | | | |
|---|---|---|---|
| 2,434,835 A | 1/1948 | Colley | |
| 2,663,467 A | 12/1953 | Douglass et al. | |
| 2,961,213 A | 11/1960 | Philippovic | |
| 3,066,853 A | 12/1962 | Landenberger | |
| 3,371,906 A | 3/1968 | Lubold | |
| 3,504,550 A | 4/1970 | Koch et al. | |
| 3,602,105 A * | 8/1971 | Slusher | 91/483 |
| 3,638,536 A * | 2/1972 | Kleinwachter et al. | 92/92 |
| 4,092,010 A * | 5/1978 | Carlson, Jr. | 251/4 |
| 4,292,969 A * | 10/1981 | Raible et al. | 604/250 |
| 4,401,107 A | 8/1983 | Haber et al. | |
| 4,553,271 A | 11/1985 | Baker | |
| 4,705,518 A | 11/1987 | Baker et al. | |
| 4,721,030 A | 1/1988 | Paynter | |
| 4,794,912 A | 1/1989 | Lia | |
| 4,917,579 A * | 4/1990 | Torma | 417/322 |
| 5,019,121 A | 5/1991 | Krauter | |
| 5,033,270 A | 7/1991 | Hardt | |
| 5,197,984 A | 3/1993 | Kedem | |
| 5,678,564 A | 10/1997 | Lawrence et al. | |
| 6,053,210 A | 4/2000 | Chapman et al. | |
| 6,146,114 A | 11/2000 | Nardacci et al. | |
| 6,254,355 B1 | 7/2001 | Gharib | |
| 6,270,053 B1 | 8/2001 | Eshel | |
| 6,278,847 B1 | 8/2001 | Gharib et al. | |
| 6,464,476 B2 | 10/2002 | Ross et al. | |
| 6,506,025 B1 | 1/2003 | Gharib | |
| 6,580,503 B2 | 6/2003 | Gharib et al. | |

(Continued)

*Primary Examiner* — Christopher Bobish
(74) *Attorney, Agent, or Firm* — One LLP

(57) ABSTRACT

First and second structures are connected by helical fibers. The orientation between the first and second structures are changed, and by doing so, the positions of the helical fibers are correspondingly changed. The position of change of the helical fibers can be used for a pumping effect, or to change some other fluidic characteristics. One other fluidic characteristics, for example, may use the movement of the helical fibers as a valve.

11 Claims, 2 Drawing Sheets

(56) References Cited

U.S. PATENT DOCUMENTS

| | | | |
|---|---|---|---|
| 6,582,208 B2 | 6/2003 | Gharib | |
| 6,608,668 B2 | 8/2003 | Gharib et al. | |
| 6,679,687 B2 | 1/2004 | Gharib | |
| 6,713,944 B2 * | 3/2004 | Omata et al. | 310/328 |
| 6,717,172 B2 | 4/2004 | Gharib et al. | |
| 6,787,972 B2 * | 9/2004 | Kim et al. | 310/328 |
| 6,956,230 B1 | 10/2005 | Gharib et al. | |
| 7,006,132 B2 | 2/2006 | Pereira et al. | |
| 7,021,604 B1 | 4/2006 | Werner et al. | |
| 7,033,132 B2 | 4/2006 | Gharib | |
| 7,163,385 B2 | 1/2007 | Gharib et al. | |
| 7,331,991 B2 | 2/2008 | Kheradvar et al. | |
| 7,387,500 B2 | 6/2008 | Gharib | |
| 7,398,818 B2 | 7/2008 | Gharib et al. | |
| 7,491,170 B2 | 2/2009 | Gharib | |
| 7,524,298 B2 | 4/2009 | Gharib et al. | |
| 7,612,869 B2 | 11/2009 | Pereira et al. | |
| 7,749,152 B2 | 7/2010 | Gharib et al. | |
| 2003/0152469 A1 * | 8/2003 | Dante et al. | 417/413.2 |
| 2003/0233143 A1 | 12/2003 | Gharib et al. | |
| 2004/0151607 A1 | 8/2004 | Gharib | |
| 2004/0193035 A1 | 9/2004 | Gharib | |
| 2005/0008509 A1 * | 1/2005 | Chang | 417/410.3 |
| 2005/0092944 A1 | 5/2005 | Patterson | |
| 2005/0275494 A1 | 12/2005 | Gharib et al. | |
| 2005/0277865 A1 | 12/2005 | Gharib et al. | |
| 2006/0195180 A1 | 8/2006 | Kheradvar et al. | |
| 2006/0196642 A1 | 9/2006 | Gharib et al. | |
| 2006/0209193 A1 | 9/2006 | Pereira et al. | |
| 2007/0038016 A1 | 2/2007 | Gharib et al. | |

* cited by examiner

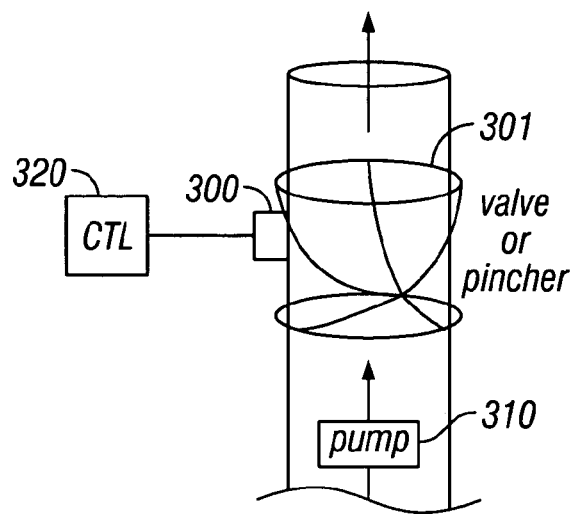
FIG. 3
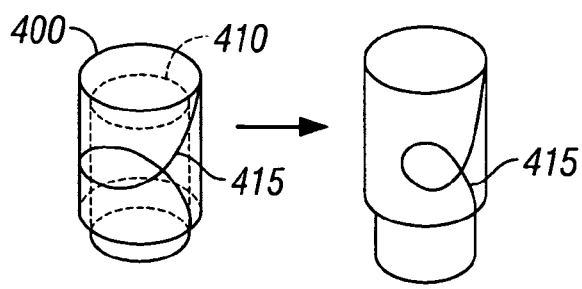
FIG. 4A  FIG. 4B
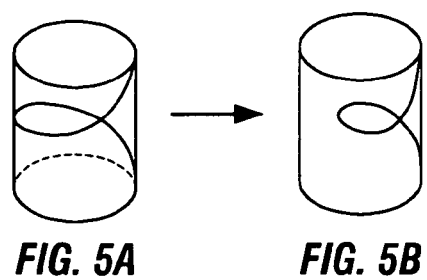
FIG. 5A  FIG. 5B
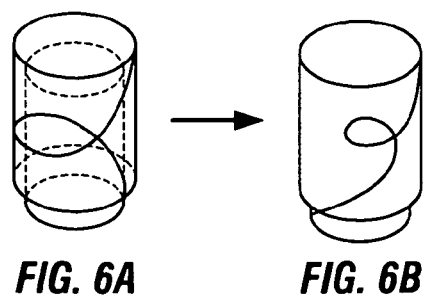
FIG. 6A  FIG. 6B

HELICALLY ACTUATED POSITIVE-DISPLACEMENT PUMP AND METHOD

PRIORITY CLAIM

This is a Continuation application of U.S. patent application Ser. No. 11/389,525, filed on Mar. 24, 2006, which is a non-provisional application of U.S. Provisional Application Ser. No. 60/665,462, filed on Mar. 25, 2005, and of which is now issued as U.S. Pat. No. 7,883,325. The disclosure of the prior applications are considered part of (and are incorporated by reference in) the disclosure of this application.

BACKGROUND OF THE INVENTION (1) Technical Field

The present invention relates to pump and, more specifically, to a helically actuated positive-displacement pump.

(2) Description of Related Art

Certain applications require pumping of fluids. One common way of pumping such fluids is by using rotating blades which cut through the fluid and cause a flow. Other techniques for pumping fluids are known including peristaltic pumps, as well as an impedance pump as described in U.S. Pat. No. 6,679,687.

Certain kinds of fluids, such as blood or certain kinds of polymers, cannot be easily pumped using rotating blades. In the case of blood, the blades may harm some of the living cells within the fluid.

SUMMARY OF THE INVENTION

The present application teaches a technique of pumping the fluids using helically and/or spirally displaceable materials. In an embodiment, the pump is caused to operate by moving at least element relative to another, to correspondingly move the displaceable materials. Another embodiment uses contraction of the helical fibers to cause a constriction which can be used as a valving effect.

BRIEF DESCRIPTION OF THE DRAWINGS

The objects, features and advantages of the present invention will be apparent from the following detailed descriptions of the preferred aspect of the invention in conjunction with reference to the following drawings where:

FIG. 3 illustrates how the device can be used as a valve or pincher;

FIGS. 4a-6b illustrate different embodiments which enable constriction of the area in the valve/pincher operation.

DETAILED DESCRIPTION

The general structure and techniques, and more specific embodiments which can be used to effect different ways of carrying out the more general goals, are described herein.

Figure 1A:
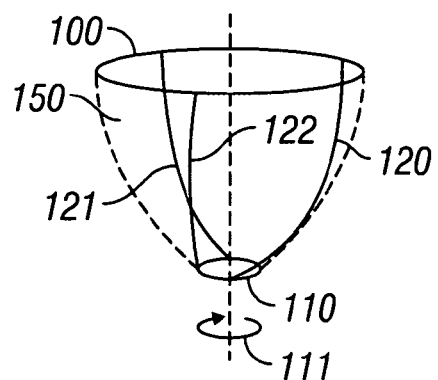
FIG. 1A and 1B show a schematic diagram of a pumping action.
Figure 1B:
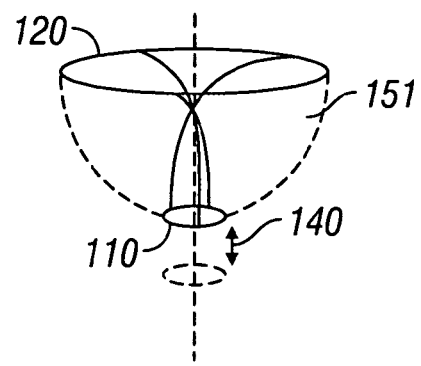

An embodiment of a pumping mechanism is shown in FIGS. 1A and 1B. The pumping mechanism as shown is a positive displacement pumping mechanism. Helical or spiral materials, e.g., fibers, wires or bands, are used to cause the movement. In the embodiment, the helical fibers are connected to rotatable structures, e.g., rings which have either the same or different diameters.

FIG. 1a shows a first ring 100 being connected to a second ring 110 by at least one connecting part, in the embodiment, helical fiber 120. In the embodiment shown, there are actually three helical fibers shown as 120, 121 and 122. It may be possible to carry out this pumping operation with as few as two helical fibers, or more fibers such as 4, 5, 6 or any number of fibers can be used.

The rings are rotated relative to one another, e.g., ring 110 is rotated in the direction shown as 111, The twisting of the rings results in a deviation of the helical fibers from their original angles and orientations. Those original angles, shown as alpha, can vary between zero and 90 degrees. The movement reduces the distance between the rings 110 and 120, to cause contraction of the helical fibers. This contraction, in turn, causes the rings 110 to displace by an amount 140 shown in FIG. 1b. The contraction reduces the size of an ellipsoidal area defined between the rings. The ellipsoidal area is shown as 150 in FIG. 1a, and a smaller ellipsoidal area shown as 151 in FIG. 1b. By reducing this area, the area is caused to hold a smaller amount of fluid. This reduction in area and/or volume can be exploited to cause a pumping effect.

The helical elements 120, 121, 122 can be either helical fibers or helical rings, or any devices which attempt to retain their specified shape. They can be formed of shape memory alloy materials such as nitinol, or other metals, composite materials, or any material of any type which attempts to maintain a shape. The framework, e.g., the rings and other parts that hold the shape, can be a molded material, formed of a soft elastic materials such as silicone, soft rubber, or Gore-Tex.

In operation, twisting either rings or both rings causes the ellipsoidal chamber 151 to collapse. Untwisting or twisting in the opposite direction causes the chamber to expand.

The pressure difference between twisted and untwisted positions can be changed by changing the size of the rings, the lengths of the helical fibers and degree of twist of the fiber. A shroud or other type material may be placed to cover the ellipsoidal chamber 151. For example, a mesh material can be used to cover the chamber, or a material which allows less fluid leakage than a mesh, e.g., a plastic. Alternatively, no covering is necessary.

Figure 2:
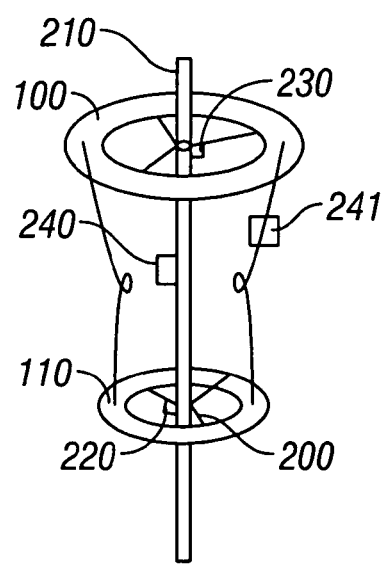
FIG. 2 illustrates how the rings can be rotated relative to one another.

FIG. 2 illustrates how the rings 100, 110 can be twisted. In the FIG. 2 embodiment, each of the rings such as 110 includes spokes 200, which guides the rings relative to a central shaft 210. A motor 220 rotates the rings relative to the shaft. There may be two motors 220, 230 as shown, or only a single motor rotating a single ring. Alternatively, the motor can be a central motor such as shown as 240 which attaches to both rings and rotates both of the rings in alternate directions. The motor may alternatively rotate the rings in the same direction, but at different rates.

Alternative techniques of moving the rings relative to one another may also be used. Contractile action of memory metal may be actuated from a distance. Piezo actuators, shown as 241, may be associated with the memory metals. Any other technique of imposing tensile or compressive forces along the helical fibers may alternatively be used.

According to another embodiment, a magnet may be used to push or pull the fibers, forcing the rings to rotate because of the helically arranged fibers.

However the motion is induced, an oscillatory action which is formed in a periodic manner can generate force caused by the pushing and/or pulling of fluid inside the chamber 150.

In another embodiment, the device can be used as a valve. FIG. 3 illustrates the device 301, placed inside a vessel 300 as shown in FIG. 3. A pump 310, which may be a pump of FIG. 1a, or any other kind of pump, may be used. The device 301 may be used as a valve or pincher, to close the vessel 300, when needed. A controller 320, for example, may control the valve 301 to open during a time that the pump 310 is pumping in the desired direction. The valve 301 may then be closed while the pump recovers its original position. For example, when the pump 310 is a FIG. 1 device, the valve 301 is opened when the pump is in the FIG. 1A position, and closed when the pump is in the FIG. 1B position. This allows the fluid to flow in a single direction. This causes unidirectional flow in a single direction.

In operation, this pump can be used to mimic cardiac ventricle action using the one-way valve embodiment for providing a unidirectional flow.

The mechanism can easily be reversed by reversing times when the valves are closed. This technique can also be used for increasing or decreasing pressure inside cardiac chambers within isovolumic phases of a cardiac cycle to cause entrance or discharge of fluid from the chamber. The entry or discharge of the fluid can also be delayed using controlled valving action, using an inertial delay, or by the opposing elastic forces of the helical bands or the chamber itself.

The amount of the valving effect may also be adjustable. A pressure variation can be produced by twisting the rings while maintaining the same axial distance between the rings. This causes the helical element to buckle under pressure inward or outward. This can be used as a technique for changing the volume of the chamber, or changing the amount of constriction of the chamber.

Another embodiment uses these techniques in pulsatile actuation of vessels for peristaltic pumps or impedance pumps. A localized reduction of cross-sectional area is used. In this embodiment, a vessel can pass between the opening sections of the rings as shown in FIG. 3.

FIGS. 4a-6B shows an embodiment where the rings are manipulated to cause the connecting fibers to form a concentric contraction. The distance between the rings are fixed, for example by holding them on one or more axes. The rings are then rotated relative to one another, while the relative angle between the rings is fixed. Alternatively, the rings may be changed in orientation. This allows the device to be used as an in-line valve relative to an encased cylindrical vessel.

FIGS. 4A and 4B illustrate how the device 410 encases cylindrical vessel 410 and changes the opening area of the vessel 410. In the relaxed position, the fibers 415 surround the vessel but cause substantially no constriction of the vessel. However, when the fibers are stressed as shown in FIG. 4B, the fiber 415 restricts the internal vessel, causing constriction of the area of the vessel. FIGS. 4A and 4B show only one fiber in order to maintain clarity, but it should be understood that multiple fibers having a similar situation can be used.

FIGS. 4A and 4B illustrate the embodiment where the distance between the rings is expanded. FIGS. 5A and 5B illustrate the opposite situation where the distance between the rings is shortened, still causing a constriction of the fiber. In the embodiment of FIGS. 6A and 6B, the relative angle between the fibers is changed in order to constrict the area. Any of these techniques may be combined to obtain a similar result.

While the above shows how the helical fibers can be moved for the valving embodiment, it should be understood that these helical fibers can also be used in a pumping embodiment using similar movement of the ring structures relative to one another.

This technique can function as an actuator for pumping fluid such as in an impedance pump or peristaltic pump, or can function as a means for selectively sustaining a circumferential pressure around a vessel or Rod.

The general structure and techniques, and more specific embodiments which can be used to effect different ways of carrying out the more general goals are described herein.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the rings can be of any shape, e.g., elliptical or rectangular.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

The controller described herein may be any kind of computer, either general purpose, or some specific purpose computer such as a workstation. The computer may be a Pentium class computer, running Windows XP or Linux, or may be a Macintosh computer. The programs may be written in C, or Java, or any other programming language. The programs may be resident on a storage medium, e.g., magnetic or optical, e.g. the computer hard drive, a removable disk or other removable medium. The programs may also be run over a network, for example, with a server or other machine sending signals to the local machine, which allows the local machine to carry out the operations described herein.

What is claimed is:

1. A method performed with first and second structures connected using a plurality of connecting parts, the method comprising acts of:

installing the first and second structures and the plurality of connecting parts in a body to use for blood flow, wherein an inner vessel is positioned within the connecting parts such that the connecting parts surround the inner vessel, the connecting parts having a relaxed position where the connecting parts cause substantially no constriction of the vessel and an actuated condition where the connecting parts constrict the inner vessel;

rotating each of the first and second structures relative to the other to change a fluidic characteristic of a pump chamber defined between the connecting parts; and actuating an actuating part to cause a change of fluidic cross section and volume of the chamber to cause a pumping effect as the change of fluidic characteristic.

2. A method as in claim 1, wherein the first and second structures and connecting parts form the pump chamber.

3. A method as in claim 1, wherein the connecting parts are formed of a shape memory material.

4. A method as in claim 1, wherein the connecting parts are helical connecting parts.

5. A method as in claim 1, wherein the connecting parts are formed of a shape memory material, with the connecting parts connected with piezo actuators to actuate the shape memory material.

6. A method as in claim 1, wherein the first and second structures and the plurality of connecting parts collectively form a conically-shaped chamber.

7. A method as in claim 1, wherein the first and second structures are substantially ring-shaped structures.

8. A method performed with first and second structures connected using a plurality of connecting parts, the method comprising acts of:

installing the first and second structures and the plurality of connecting parts in a body to use for blood flow;

rotating each of the first and second structures relative to the other to change a fluidic characteristic of a pump chamber defined between the connecting parts, wherein a central shaft is provided between each of the first and second structures, and wherein each of the first and second structures includes spokes that guide the structures relative to the central shaft when rotating; and actuating an actuating part to cause a change of fluidic cross section and volume of the chamber to cause a pumping effect as the change of fluidic characteristic.

9. A method as in claim 8, wherein a motor rotates the structures relative to the shaft.

10. A method as in claim 8, wherein a motor rotates the structures in alternate directions about the central shaft.

11. A method as in claim 8, wherein a motor rotates the structures in a same direction at a dissimilar rate about the central shaft.

\* \* \* \* \*